US007249025B2

(12) United States Patent
Junqua et al.

(10) Patent No.: US 7,249,025 B2
(45) Date of Patent: Jul. 24, 2007

(54) PORTABLE DEVICE FOR ENHANCED SECURITY AND ACCESSIBILITY

(75) Inventors: Jean-Claude Junqua, Santa Barbara, CA (US); Eugene J. Seagriff, Edison, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 859 days.

(21) Appl. No.: 10/435,144

(22) Filed: May 9, 2003

(65) Prior Publication Data
US 2004/0225504 A1 Nov. 11, 2004

(51) Int. Cl.
*G10L 15/22* (2006.01)
(52) U.S. Cl. .................................. 704/271; 704/275
(58) Field of Classification Search ................ 704/271, 704/275
See application file for complete search history.

(56) References Cited

U.S. PATENT DOCUMENTS

| | | | | |
|---|---|---|---|---|
| 5,524,051 A | * | 6/1996 | Ryan | 380/237 |
| 5,748,841 A | * | 5/1998 | Morin et al. | 704/257 |
| 5,999,895 A | | 12/1999 | Forest | |
| 6,005,549 A | * | 12/1999 | Forest | 345/157 |
| 6,233,561 B1 | * | 5/2001 | Junqua et al. | 704/277 |
| 6,513,008 B2 | * | 1/2003 | Pearson et al. | 704/260 |
| 6,584,439 B1 | * | 6/2003 | Geilhufe et al. | 704/270 |
| 6,598,018 B1 | * | 7/2003 | Junqua | 704/251 |
| 6,671,659 B2 | * | 12/2003 | Troia et al. | 702/188 |
| 6,895,257 B2 | * | 5/2005 | Boman et al. | 455/556.1 |
| 6,996,528 B2 | * | 2/2006 | Morin et al. | 704/254 |
| 7,137,126 B1 | * | 11/2006 | Coffman et al. | 719/328 |

OTHER PUBLICATIONS

Press Release from Xerox dated Mar. 20, 2003 regarding equipment for people with disabilities; 2 pages.
Website search for remote user interface—http://search.atomz.com/search/?sp-a=sp10018800&sp-f=iso-8859-1&sp-q=remote+user and http://www.concept-group.co.uk/solutions/photocopiers/ir6000i.htm; 6 pages, Oct. 2, 2003.

* cited by examiner

*Primary Examiner*—Susan McFadden
(74) *Attorney, Agent, or Firm*—Harness, Dickey & Pierce, PLC

(57) ABSTRACT

A portable device increases user access to equipment utilizing a communications interface providing communication with the equipment in accordance with various, combinable embodiments. In one embodiment, a speech generator generates speech based on commands relating to equipment operation, which may be received from the equipment via the communications interface. A selection mechanism allows the user to select commands and thereby operate the equipment. In another embodiment, a command navigator navigates commands based on user input by shifting focus between commands, communicates a command having the focus to the speech generator, and allows the user to select a command. In a further embodiment, a phoneticizer converts the commands and/or predetermined navigation and selection options into a dynamic speech lexicon, and a speech recognizer uses the lexicon to recognize a user navigation input and/or user selection of a command. Speaker verification can also be used to enhance security using a speech biometric.

20 Claims, 5 Drawing Sheets

PORTABLE DEVICE FOR ENHANCED SECURITY AND ACCESSIBILITY

FIELD OF THE INVENTION

The present invention generally relates to enhancement of security and accessibility of equipment in relation to persons with disabilities, and particularly relates to use of a portable device to interface with equipment and provide expanded functionality relating to equipment command communication, navigation, and selection capability utilizing speech generation, speaker verification, and/or speech recognition.

BACKGROUND OF THE INVENTION

Today's task of rendering equipment accessible to persons with disabilities is an important one that can, unfortunately, increase the cost of equipment. One attempted solution has involved the development of equipment that can surrender its function to another, complimentary terminal that provides the accessible operation. Thus, purchasers can buy the base unit, such as a copy machine, and, if needed, also purchase an expensive, high power, dedicated terminal that allows users requiring enhanced access to operate the equipment. This terminal effectively corresponds to a computer with all the functionalities thereof, and possesses all of the software and computational power necessary to emulate the on-board computer of the equipment and operate its components accordingly. This solution, however, suffers from the disadvantages of high expense for the terminal, which is typically incurred to provide enhanced access at a single location.

What is needed is a way to allow individual persons with disabilities to enhance the functionality of equipment in multiple locations as needed in relation to the user's particular needs, while minimizing increased cost of the underlying, enhanced equipment. What is also needed is a way to permit a user to enhance various types of equipment in an office environment as needed without requiring purchase of additional accessibility devices for each piece and/or type of equipment. The present invention provides a solution fulfilling these needs.

SUMMARY OF THE INVENTION

In accordance with the present invention, a portable device increases user access to equipment utilizing a communications interface providing communication with the equipment in accordance with various, combinable embodiments. In one embodiment, a speech generator generates speech based on commands relating to equipment operation, which may be received from the equipment via the communications interface. A selection mechanism allows the user to select commands and thereby operate the equipment. In another embodiment, a command navigator navigates commands based on user input by shifting focus between commands, communicates a command having the focus to the speech generator, and allows the user to select a command. In a further embodiment, a phoneticizer converts the commands and/or predetermined navigation and selection options into a dynamic speech lexicon, and a speech recognizer uses the lexicon to recognize a user navigation input and/or user selection of a command. Speaker verification can also be used to enhance security using a speech biometric.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
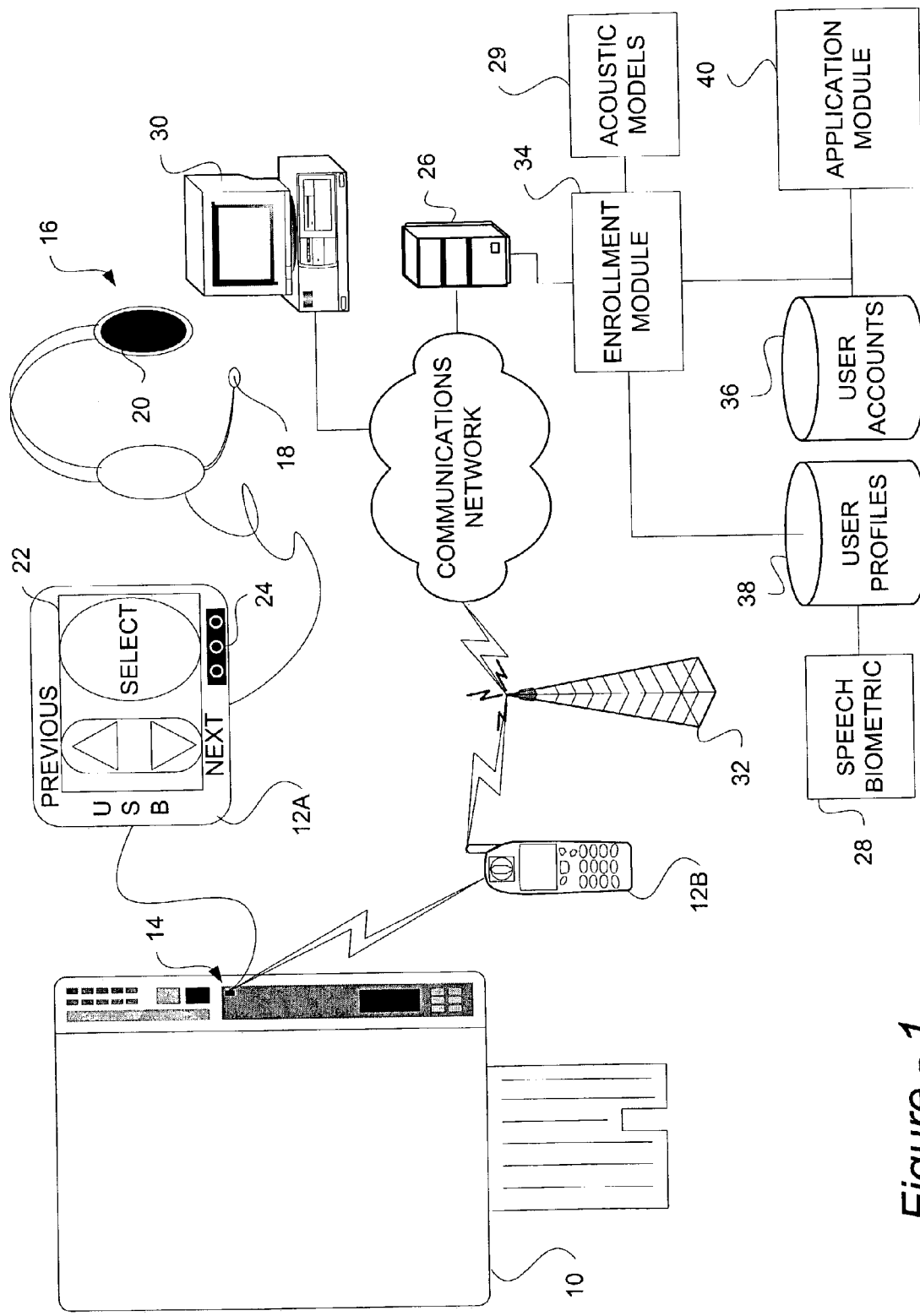
FIG. 1 is a partial-perspective block diagram illustrating a security and accessibility enhancement system in accordance with the present invention.

By way of overview, FIG. 1 illustrates security and accessibility enhancement system in accordance with the present invention. Office equipment 10, such as a copy machine, is adapted to communicate with a portable device 12A or 12B via a communications interface 14, that may be wired, such as a USB port, and/or wireless, such as Bluetooth. The portable device may take many forms providing additional and/or related functions, such as a cell phone, Personal Digital Assistant (PDA), electric wheelchair, and/ or other assistive device. Alternatively, the portable device is designed to have limited functionality and a lower associated cost. For example, device 12A is a low power device implementing a head set 16 to provide an audio input 18 and output 20. Its USB interface allows it to download a preconfigured linear command menu lists from equipment 10, and its built-in speech generation functionality communicates the commands to the user via output 20.

Portable device 12A provides a variety of optional input alternatives to users. For example, user interface 22 of relatively large buttons permits the user to navigate the commands of the menu list and select a command as needed and thereby operate equipment 10. Also, an optional switching mechanism interface 24 also permits users to connect, configure, and use a sip/puff switch, blink or wink switch, force resisting sensor cuff, and/or other assistive switching device to navigate and select commands as desired. Multiple switch inputs and/or pattern recognition may be implemented on device 12A to ensure that a user has an appropriate set of switch manipulation options. Further, device 12A may use a phoneticizer to construct a dynamic lexicon based on a received command menu, and use it to recognize user speech input from input 18 for purposes of navigation and selection. Speaker verification employing a user speech biometric may also provide security by ensuring only the user can operate the device. Contents of the lexicon are dependent, at least in part, on the menu list which may include names of equipment commands, and/or names corresponding to navigation and selection options. For example, a user may select a command by name or number, and may navigate and select commands using keywords like "up", "down", "enter", "previous", "next", and/or "select" that are provided by the equipment 10. List element numbers and/or navigation options may additionally or alternatively be permanently resident in the lexicon. It may therefore be additionally possible for the user to pre-configure an utterance substitution for a number or keywords in special circumstances relating to alternative embodiments.

The portable device 12A or 12B may be configured by connecting to a configuration server 26 over a communications network, such as the Internet, and downloading a user speech biometric 28 and/or application module for operating portable device 12A or 12B. Device 12A, for example, may use its USB interface to connect with a user's personal computer 30, while device 12B may use its wireless interface to connect via cell tower 32. Once connected, enrollment module 34 may require the user to set up a user account 36, and this procedure may include selecting a predetermined user profile 38 relating to a user disability and/or user preferences, or may include creating a user profile 38 by specifying a disability and/or user preferences. It may include user expression of a language preference, accompanied by selection of an application module adapted to translate commands from one language to another. It may also include a training session whereby a user acoustic model is developed by adapting a general acoustic model 29, and/or the user speech biometric 28 may be developed and maintained. The user acoustic model, a general acoustic model 29, and/or the user biometric 28 may subsequently be downloaded to the device 12A or 12B as required by the user. It should be understood that a user speech biometric may correspond to user dependency data, such as a point in speaker space, that is also useful for adapting a general acoustic model, and that the user acoustic model may correspond to a combination of the general acoustic model 29, which is user independent, and speaker dependent data which may or may not be related to the speech biometric data. Further, module 34 may select an application module 40 specific to the disability and/or user preferences and communicate it to device 12A and or 12B, thereby causing device 12A or 12B to operate accordingly. As a result, device functionality, user navigation options, switching mechanism preferences and related pattern recognition, dialog modes, acoustic models, and user biometrics can be provided to one or more devices 12A or 12B, thereby facilitating set up of new and subsequent devices through a system already provided to the user in an accessible fashion.

It should be readily understood that functionality may be alternatively and/or additionally supplied to an equipment 10, device 12A or 12B, or server 26 in accordance with the present invention. For example, equipment 10 may be supplied with some or all of the command navigation and selection, speech generation, speaker verification, and/or speech recognition, and the portable device may correspond to an SD card or other portable memory providing a user speech biometric and/or acoustic models to equipment 10 via interface 14 corresponding to a memory card slot or other suitable interface. Also, server 26 may be adapted to provide command menus to the portable device on demand for specific types of equipment 10, and even provide some or all of the command navigation and selection, speech generation, and/or speech recognition functionality, such that the portable device merely provides a user interface for communicating with server 26, and for relaying command selections from server 26 to equipment 10. It should be readily understood that functionality may be redistributed among the equipment, portable device, and/or server in a variety of ways, and that the present invention may or may not combine these functionalities in a number of ways as the need arises. Moreover the following description in relation to FIGS. 2-5 serve to provide a detailed description of a particular embodiment that may be altered as needed in accordance with the foregoing alternative implementations of the present invention.

Figure 2:
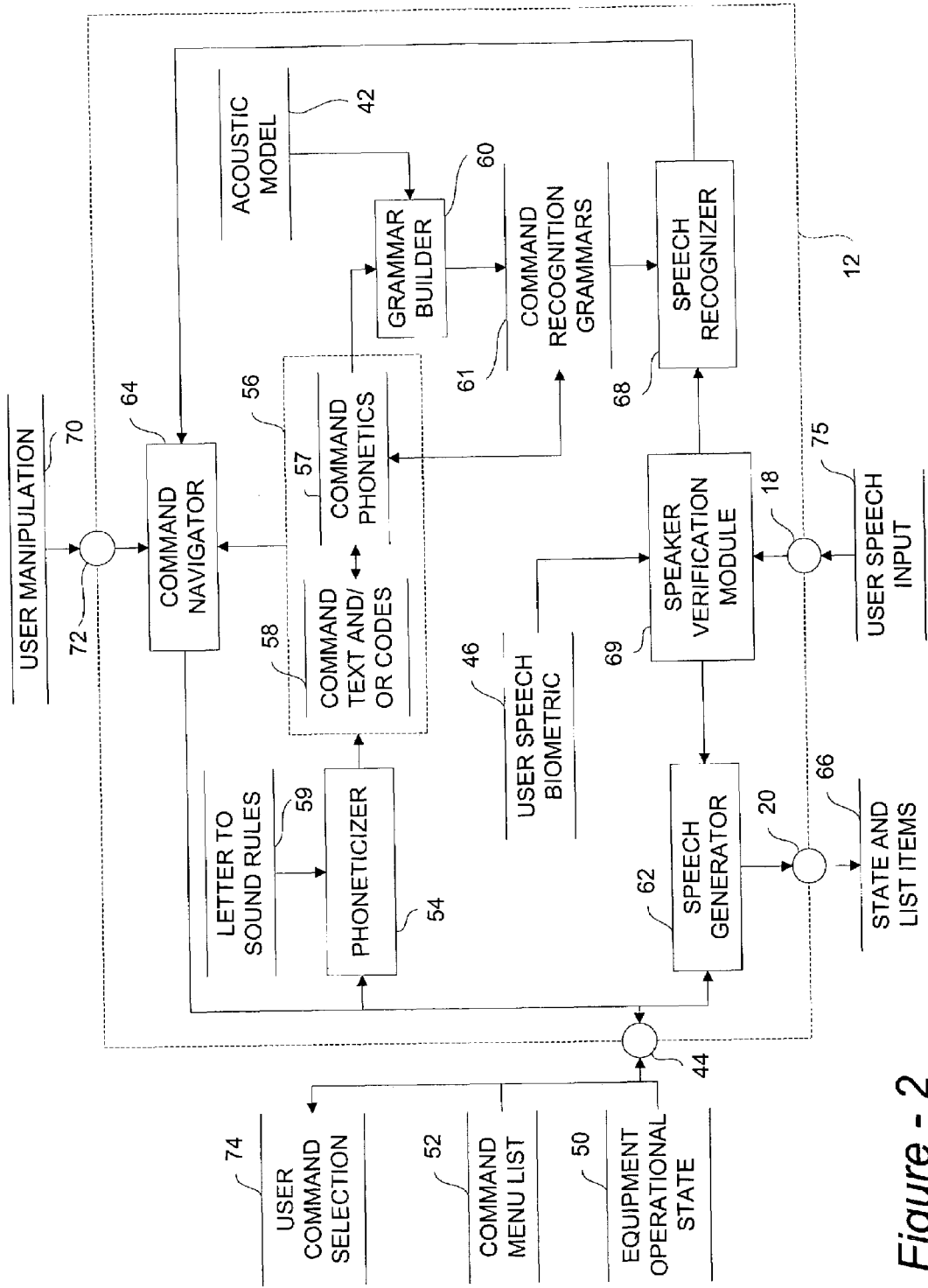
FIG. 2 is a block diagram illustrating a portable device adapted to increase security and accessibility of equipment in accordance with the present invention.

FIG. 2 illustrates a portable device 12 in accordance with the present invention. Therein, a user speech biometric 46 and an acoustic model 42, which may have been previously adapted to the user during a supervised training session, have previously been received via interface 44 and stored in device memory. It should be readily understood that the acoustic model 42 may be updated in an unsupervised manner if desired in an alternative embodiment, and/or not adapted at all. Also, an application module defining functionality of the device 12 may have been previously stored therein. Upon connection to the equipment via interface 44, device 12 is further receptive of equipment operational state 50 and command menu list 52. In response, device 12 uses phoneticizer 54 to generate command phonetics 57 based on letter to sound rules 59, and stores phonetics 57 in device memory in association with corresponding selectable commands 58, thereby forming dynamic lexicon 56. Grammar builder 60 in turn generates command recognition grammars 61 based on acoustic model 42, and stores grammars 61 in device memory in association with corresponding command phonetics 57.

The process of creating the dynamic lexicon at 60 may take many forms as determined by user operational preferences, and data type and content of the command menu list 52. For example, if the user prefers to navigate and select commands by number, then the process may include assigning the command text (and/or a corresponding control code) different numbers and storing them in memory in association with the numbers of the lexicon. Also, if the user wishes to navigate commands by keyword and select commands by name, then the process may include converting text of the command names into the lexicon and storing the command text (and/or a corresponding control code). In general, however, command text is stored as selectable commands 58, and names, numbers, and/or keywords relating to the commands and navigation and selection thereof are also stored in lexicon 56.

Meanwhile, speech generator 62 communicates text of state 50 to the user via audio output 20. If the equipment is in a ready state, command navigator 64 assigns the initial focus to the first selectable command and communicates the selectable command text and/or number to speech generator 62, which also generates speech from command text and/or number. As a result, the user may receive the state of the equipment and first menu command whenever a new menu is provided and the device is ready. If, however, the device is not ready, then command navigator 64 may repeatedly communicate the non-ready state text (such as "out of paper") to speech generator 62. Once the ready state is achieved, however, the user receives the ready state notification and the first command at 66, and speech recognizer 68 and command navigator 64 may await a navigation input or selection.

The user may navigate and select the selectable commands 58 in a variety of ways in accordance with user operational preferences. For example, command navigator 64 may receive a user manipulation 70 via switching mechanism input 72 that indicates a desire to move up or down (or forward or back) in the list of commands 58 by shifting the focus among the commands 58. Navigator 64 may accordingly retrieve the next or previous command from commands 58 as directed, communicate it to generator 62, and await a further instruction. Command navigator 64 may alternatively and/or subsequently receive a user manipulation 70 via switching mechanism input 72 that indicates a desire to select the command last heard by the user, which is the one currently having the focus. Navigator 64 may accordingly retrieve the command having the focus from commands 58, and communicate it to the equipment via interface 44 in the form of a command selection 74, which may be a control code and/or text. Also, speech recognizer 68 may receive a user speech input 75 via audio input 18, recognize the input 75 as a navigation input or selection based on lexicon 56, and communicate the input to navigator 64 for appropriate processing. Generator 62 may generate a request for a speech input, perhaps password-based, upon initial connection to the equipment, thereby requiring a dedicated speaker verification procedure before beginning operation. Alternatively or additionally, all speech input 75 may be intercepted by speaker verification module 69 and analyzed with respect to user speech biometric 46 in a speaker verification procedure. In this case, verification may result in seamless operation, whereas non-verification may result in generation of a warning message by speech generator 62, and non-operation of speech recognizer 68 and/or command navigator 64 until an input speech 75 results in speaker verification.

The response to the command selection 74 output from device 12 to the equipment may vary depending on the selected command. For example, if the device 12 has commanded the equipment to begin a noisy operation, the device 12 may receive a non-ready state 50 from the equipment, which prevents recognition and effective manipulation until the operation is finished. Alternatively, the device 12 may receive a ready state 50 and a single element command list, such as "cancel printing" which allows the user to cancel printing, for example, during operation of a copy machine. As a further alternative, the user may have selected a command that retrieves a subsequent command menu list, rather than causing the device to command one of its components or adjust an operational setting. In this case, the device may again receive the state 50 and a new list 52 as requested, and then continue to operate as above.

Figure 3:
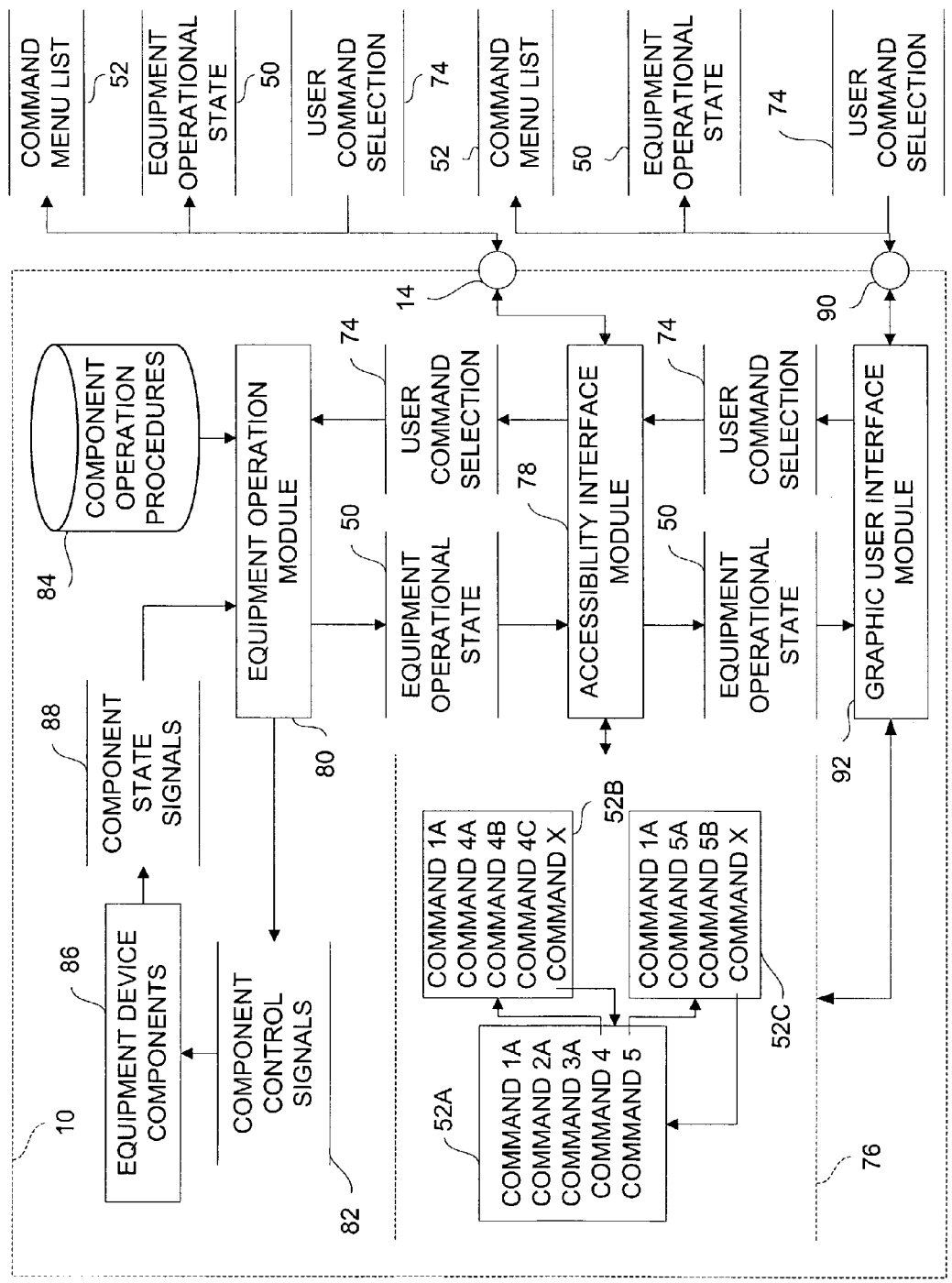
FIG. 3 is a block diagram illustrating security and accessibility enhancement-capable equipment in accordance with the present invention.

FIG. 3 illustrates a security and accessibility enhancement-capable equipment 10 that is adapted to operate with the portable device described above. For example, equipment 10 has a datastore 76 menu of embedded commands for operating the equipment. Preferably, the commands are pre-structured in a menu format to provide a hierarchical command structure of linear lists 52A-52C of commands relating to hierarchically related functions of the equipment 10. For example, list 52A has "command 1A", "command 2A", and "command 3A" that relate directly to equipment functions such as "print", "increase print count", and "decrease print count". It additionally has elements "command 4" and "command 5", such as "reduce/enlarge" and "adjust contrast" that describe super-classes relative to menu lists composed of sub-class elements. For example, "command 5" serves as a pointer to list 52C, which contains "command 1A", "command 5A", "command 5B", and "command x", such as "print", "lighten", "darken", and "return to main menu". These command lists may additionally or alternatively include navigation commands. As a result, the equipment 10 provides the portable device with a set of linear menu lists via accessibility interface module 78 and interface 14, and the structure, content, and organization of the lists provides the dialogue functionality of the portable device.

Accessibility interface module 78 is adapted to detect connection of the portable device via the communications interface 14 and to communicate the main menu list 52 automatically to the portable device. Subsequent menu lists are communicated in response to user command selections 74 requesting the lists, and/or upon arrival of an equipment operational state 50, such as a "ready state", from equipment operation module 80. Module 78 is further adapted to communicate a command selection 74 to module 80 as appropriate. For example, accessibility interface module 78 may be adapted to communicate the commands to the portable device as text of the menu list 52, and to accept selection of a command from the portable device as text of the menu list 52. Alternatively, accessibility interface may be adapted to communicate the commands to the portable device as text of the menu in association with control codes relating to operation of the equipment, and to accept selection of a command from the portable device as a control code relating to the command. In either case, module 78 makes whatever transformation may be necessary to the command selection to effectively communicate the appropriate command to module 80, which generates component control signals 82 in accordance with the selection 74 and procedures 84, and communicates the signals 82 to the equipment device components 86. Module 80 also receives the equipment device component operational state signals 88 and generates the equipment operational state 50 in accordance with component operation procedures 84.

Equipment 10 employs a user interface 90, such as buttons and a touchscreen, in conjunction with a graphic user interface module 92, to operate the equipment in a normal mode when the portable device is not connected. Accordingly, menu lists 52 are communicated to the user via the interface 90, along with equipment operational state 50, and command selections 74 are relayed to module 80 through module 78. Thus, module 78 can control when and if input from interface 90 is utilized to operate equipment 10 by selectively communicating it to module 80. It should be readily understood that module 92 and interface 90 may simultaneously present more commands to the user than may be presented by the portable device, and can simultaneously display menu lists for touchscreen selection and/or map some lists or commands to buttons of interface 90. It should also be readily understood that equipment 10 may ignore some commands of the menu lists, that equipment 10 may alternatively employ a wholly separate user interface functionality that does not utilize the menu lists, and that equipment 10 may alternatively maintain the menu lists solely for use with the portable device.

Figure 4:
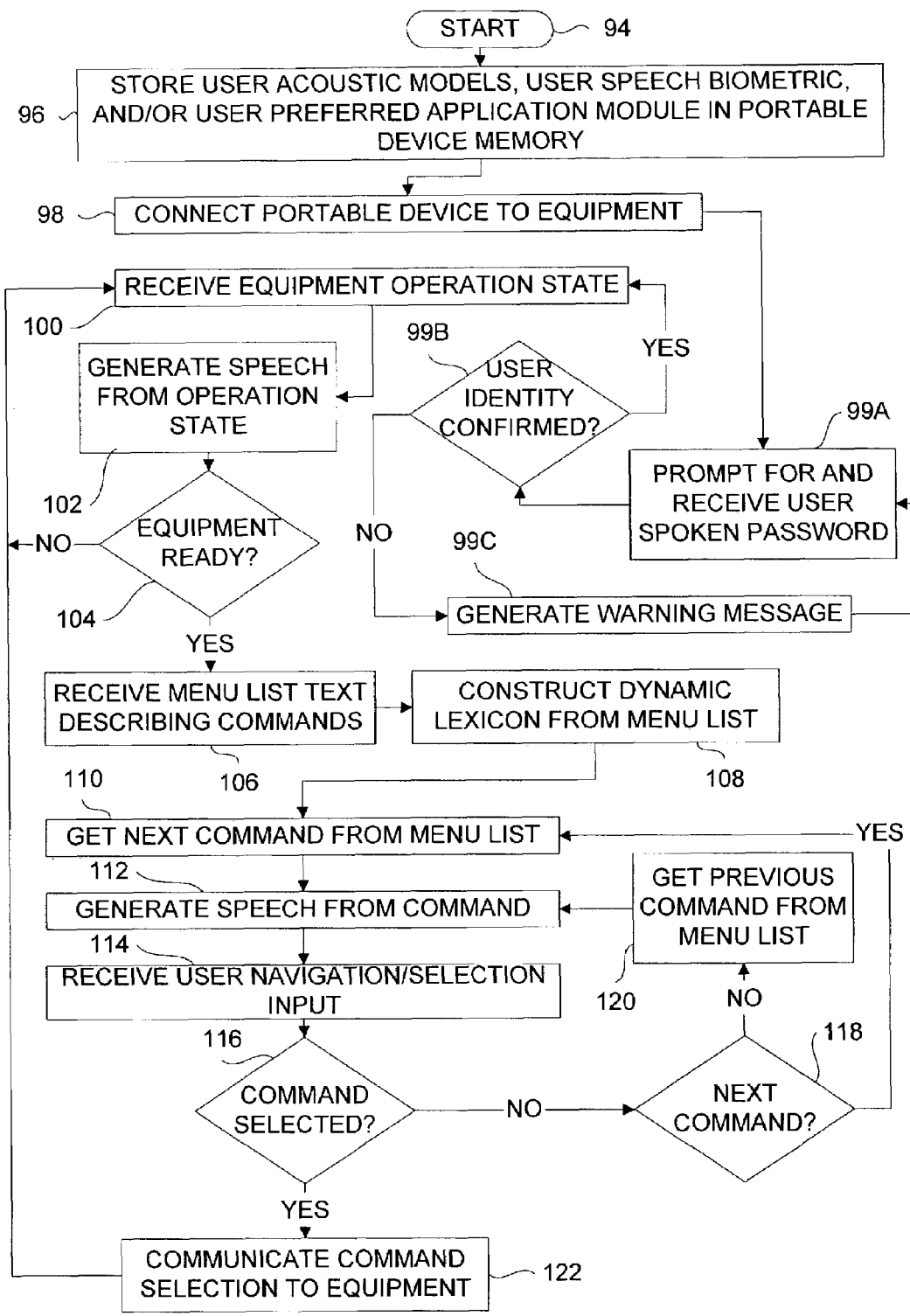
FIG. 4 is a flow diagram depicting a method of operation for a portable device adapted to increase security and accessibility of equipment in accordance with the present invention.

FIG. 4 illustrates a method of operation for a portable device in accordance with the present invention. Beginning at 94, the method includes storing an acoustic model, user speech biometric, and/or user preferences in portable device memory at step 96, and connecting the portable device to the equipment at step 98. The method further includes prompting the user for and receiving a spoken password at step 99A. If the user identity is not confirmed as at 99B, then the method includes generating a warning message at step 99C and returning to step 99A. Otherwise, the method proceeds with receiving an equipment operation state from the equipment at step 100, and generating speech based on the operation state at step 102. If the state is not a ready state as at 104, then the method returns to step 100 and repeatedly loops through steps 100-104 until a ready state is received. Once the equipment is determined to be ready as at 104, then the menu list is also received at step 106, and the dynamic lexicon is constructed from the menu list. The focus is given to the first menu list item, and the focused upon item is retrieved at step 110 and communicated as speech to the user at step 112. A user navigation input is then received at step 114 by speech recognition and/or switch mechanism manipulation. This navigation input may correspond to a command selection in one of three forms: a command name recognized by a speech recognizer; a recognized keyword for selecting the command having the focus; or a button press preconfigured to select the command having the focus. This navigation input may alternatively correspond to a command navigation in one of two forms: a recognized keyword for shifting the focus in one of two directions; or a button press preconfigured to shift the focus in one of two directions. These directions are generally referred to as "previous" and "next" in this example. Thus, if a command was not selected as at 116, then the method includes either shifting the focus to and getting the next command in the list as at 118 and step 110, or shifting the focus to and getting the previous command in the list at 118 and step 120, followed in either case by continued processing at step 112. If, however, the navigation input corresponds to a command selection, then the command selection is communicated to the equipment at step 122, and the method returns to step 100.

Figure 5:
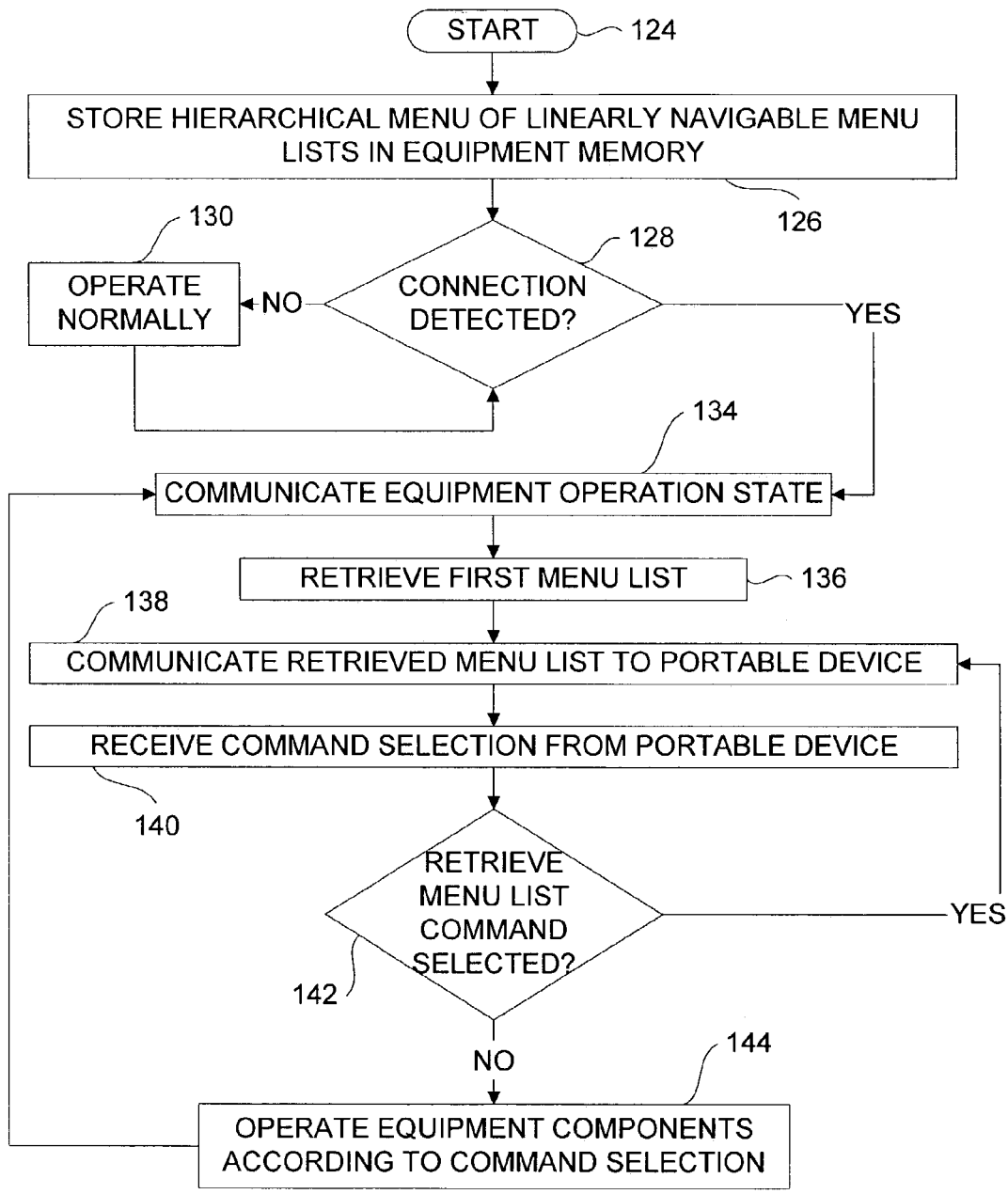
FIG. 5 is a flow diagram depicting a method of operation for security and accessibility enhancement-capable equipment in accordance with the present invention.

FIG. 5 illustrates a method of operation for security and accessibility enhancement-capable equipment in accordance with the present invention. Beginning at 124, the method includes storing a hierarchical menu of linearly navigable menu lists in memory at step 126. Then, depending on whether connection to the portable device is detected at 128, the equipment operates normally at step 130 or operates according to input from the portable device at steps 134-144. Accordingly, step 134 includes communicating an equipment operation state to the portable device at step 134, retrieving a first (or "main") menu list at step 136, and communicating the retrieved menu list to the portable device at step 138. Then, the method includes receiving a command selection from the portable device at step 140, and determining whether the command selection specifies retrieval of another menu list as at 142. If so, then the specified menu list is retrieved and communicated to the portable device at step 138, and steps 138-140 continue to loop until an equipment component operation command is determined to be selected as at 142. Then, the equipment components are operated in accordance with the selected command at step 144, and the method returns to step 134.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A portable device adapted to increase accessibility of equipment, comprising:
    a communications interface adapted to communicate with the equipment and to receive from the equipment commands relating to operation of the equipment;
    a speech generator adapted to generate speech based on the commands;
    an auditory output adapted to communicate the speech to the user; and
    a selection mechanism adapted to allow the user to select a command and thereby operate the equipment.

2. The portable device of claim 1, wherein the device has a command navigator adapted to accept a user navigation input, to navigate the commands by shifting focus between commands based on the user navigation input, and to communicate a command having the focus to said speech generator.

3. The portable device of claim 2, comprising a user interface providing a switching mechanism adapted to provide the user navigation input, thereby navigating a linear list of commands, and to provide the selection capability relating to an element of the list having the focus.

4. The portable device of claim 3, wherein the user interface includes a switching mechanism interface adapted to connect with a user's preferred assistive switching mechanism, and to accept user navigation input from the user's preferred assistive switching mechanism in accordance with user preferences.

5. The portable device of claim 2, comprising a speech recognizer operable to recognize user speech input as user navigation input according to user preferences.

6. The portable device of claim 1, comprising a memory adapted to store user preferences, wherein said communications interface is adapted to connect to a communications system and inform said memory.

7. The portable device of claim 6, wherein the user preferences include a user speech biometric, the portable device comprising a speaker verification module adapted to authorize the user based on the speech biometric.

8. The portable device of claim 6, wherein the user preferences include a procedure of operation adapting the device to operate in accordance with a user profile relating to a user disability.

9. The portable device of claim 1, wherein said communications interface is adapted to receive an equipment operation state, and said speech generator is adapted to generate speech based on the equipment operation state.

10. The portable device of claim 1, wherein the commands are pre-structured in a menu form to provide a hierarchical command structure of linear lists of commands relating to hierarchically related functions of the equipment.

11. The portable device of claim 1, wherein said communications interface corresponds to a wired cable connection port.

12. The portable device of claim 1, wherein said communications interface corresponds to a wireless transmitter and receiver.

13. An equipment accessibility enhancement method, comprising:
    establishing a connection between the equipment and a portable device adapted to enhance accessibility of the equipment;
    communicating commands relating to operation of the equipment from the equipment to the portable device;
    accepting a user navigation input;
    shifting focus between commands based on the user navigation input;
    generating speech based on a command having the focus;
    accepting user selection of a command; and
    communicating the user selection of the command from the portable device to the equipment.

14. The method of claim 13, comprising:
    accepting a user selection of a command having the focus based on predetermined criteria.

15. The method of claim 14, comprising:
- constructing a dynamic lexicon based on commands relating to equipment operation;
- receiving a user speech input; and
- accepting a user selection of a command by recognizing the user speech input based on the dynamic lexicon.

16. The method of claim 15, wherein said accepting a user selection of a command having the focus includes recognizing a user speech input based on the dynamic lexicon, wherein the dynamic lexicon is adapted for use by a speech recognizer in recognizing selection of a command having the focus.

17. The method of claim 15, wherein said accepting the user navigation input includes recognizing a user speech input based on the dynamic lexicon, wherein the dynamic lexicon is adapted for use by a speech recognizer in recognizing selection of a pre-determined command navigation option.

18. The method of claim 13, wherein said accepting the user navigation input includes detecting user manipulation of a switching mechanism configured to indicate selection of a pre-determined command navigation option.

19. The method of claim 13, wherein said accepting a user selection of a command having the focus includes detecting user manipulation of a switching mechanism configured to indicate selection of the command having the focus.

20. The method of claim 13, comprising generating speech based on a current state of operation relating to the equipment.

* * * * *